United States Patent [19]

Kent et al.

[11] Patent Number: 4,869,110
[45] Date of Patent: Sep. 26, 1989

[54] LASER STRAIN EXTENSOMETER FOR MATERIAL TESTING

[75] Inventors: David L. Kent, Framingham; Rashid N. Khan, Walpole, both of Mass.

[73] Assignee: Systems Integration Technology, Inc., Stoughton, Mass.

[21] Appl. No.: 208,143

[22] Filed: Jun. 16, 1988

[51] Int. Cl.[4] .............................................. G01N 3/08
[52] U.S. Cl. .......................................... 73/800; 73/1 B
[58] Field of Search .......................... 73/800, 1 B, 826

[56] References Cited

U.S. PATENT DOCUMENTS

| | | | |
|---|---|---|---|
| 3,592,545 | 7/1971 | Paine | 73/800 X |
| 3,765,774 | 10/1973 | Petrohilos | 356/156 |
| 3,853,406 | 12/1974 | Zanoni | 356/167 |
| 3,856,411 | 12/1974 | Zanoni | 356/167 |
| 3,856,412 | 12/1974 | Zanoni | 356/167 |
| 3,885,424 | 5/1975 | Ryckman et al. | 73/800 X |
| 3,885,875 | 5/1975 | Rosenfeld et al. | 356/120 |
| 3,905,705 | 9/1975 | Petrohilos | 356/160 |
| 4,007,992 | 2/1977 | Petrohilos et al. | 356/160 |
| 4,031,746 | 6/1977 | Furuta et al. | 73/95 |
| 4,129,384 | 12/1978 | Walker et al. | 356/381 |
| 4,199,259 | 4/1980 | Harris | 356/387 |
| 4,388,832 | 1/1983 | Kaule | 73/655 |
| 4,427,296 | 1/1984 | Demarest et al. | 355/387 |
| 4,474,466 | 10/1984 | McDonach et al. | 356/32 |
| 4,483,618 | 11/1984 | Hamar | 356/400 |
| 4,564,765 | 1/1986 | Blaich | 250/561 |

OTHER PUBLICATIONS

Instron Corp. Technical Literature, Instron 4500 Series Universal Testing Instruments.

Primary Examiner—Jerry W. Myracle
Attorney, Agent, or Firm—Lahive & Cockfield

[57] ABSTRACT

A non-contact, laser strain extensometer for use in materials testing utilizes a revolving laser beam to measure the separation of benchmarks placed on the specimen to be tested. The reflection of the laser beam from the benchmarks is focused on a photosensor to generate electronic pulses. The time duration between these pulses can be precisely measured using electronic counters. This time duration correlates with the distance separating the benchmarks. The revolving beam can be generated either by rotating polygonal mirror or an oscillating mirror.

10 Claims, 4 Drawing Sheets

LASER STRAIN EXTENSOMETER FOR MATERIAL TESTING

BACKGROUND OF THE INVENTION

The present invention relates generally to non-contact strain extensometers for mechanical testing, including testing of tensile, flexural, compression, shear, tear, fatigue and fracture values. In particular, the invention relates to a system which employs a laser or light beam to scan the separation of benchmarks on a test specimen. Non-contact extensometers are ideally suited for robot-automated materials testing where conventional contact extensometers cannot be easily used.

Contact extensometers using linear variable differential transformers (LVDTs), strain gages or rotary potentiometers have been available for many years. These devices have the following deficiencies:

(i) They require manual dexterity to clamp on and remove from the test specimen. If not mounted properly, they tend to slip and produce erroneous data.

(ii) Strain gage/LVDT extensometers have limited measurement range. They cannot be used to measure high elongations in elastomeric type materials, or some of the new materials which have high strengths and high elongation.

(iii) Clamp-on, "pogo" extensometers can measure high elongations, but are not accurate for measuring low elongations as found in high strength materials.

(iv) Contact extensometers cannot readily be used in conjunction with robot automated testing systems which operate without any human involvement.

To overcome some of these problems, non-contact strain extensometers have been proposed and developed. A good example is U.S. Pat. No. 4,031,746 (Furuta et al) which discloses a non-contact, optical extensometer. This device uses two light sources reflecting from benchmarks placed on the specimen under test. The reflected light from the two benchmarks is sensed by sensors mounted on servo-motor controlled trackers. As the benchmarks separate during test the servomotor drives the trackers to follow the benchmark and measure the strain. Optical, non-contact extensometers of this type have the following disadvantages:

(i) The accuracy of measurement depends upon the mechanical motion and precision of the servo-controllers. While these accuracies are reasonable for high elongation materials, they cannot achieve the $+/-$ 0.5% accuracy required for high strength materials. The Furuta et al patent, for example, discloses measurement of only the elongation at break, and not the strain in the critical modulus region where higher accuracies are required.

(ii) Some optical extensometers require manual focusing of each sensor on the benchmarks prior to testing. Those which do not require focusing have to provide a mechanism of "hunting" for the benchmarks and locking onto them.

(iii) Mechanical tracking devices suffer from error-producing backlash, high maintenance and wear-and-tear problems. In addition they tend to be bulky devices because of the number of mechanical components required.

A variety of techniques have been described by Petrohilos (U.S. Pat. Nos. 3,765,774; 3,905,705; and 4,007,992), Zanoni (U.S. Pat. No. 3,853,406) and others for using lasers to scan an object to measure its dimensions. These techniques share the following characteristics:

(i) A rotating polygon or mirror is used to produce a revolving beam. This beam is converted into a parallel beam by using optical lenses. However, the object to be measured must necessarily be less than the size of the lens or else it will be outside the scan of the laser.

(ii) The object whose dimensions are to be measured is placed in the path of the parallel beam, thus obstructing the transfer of energy to a sensor on the other side. The duration of the obstruction is measured by timers to obtain measure of the dimension.

These non-contact laser gages cannot readily be used in mechanical testing for the measurement of strain, for the following reasons:

(i) The specimen being tested is typically of a "dog-bone" shape. Thus, in contrast to dimensional measurement settings, the specimen obstructs the entire scan.

(ii) Benchmarks are marked on the specimen under test and it is necessary to measure the reflected energy rather than obstructed energy.

(iii) The separation of the benchmark varies from one (1) inch at the start of the test to up to 20 inches at the end of the test. A parallel beam of such a size is not practical.

The prior art also contains bar code readers which use laser scanner and the sensing of reflected energy. These systems are not used for measurement of objects, but instead for decoding series of parallel bars printed on a product's package. The sequence of varying width bars is typically not longer than two inches, with bar lengths of under one inch. Conventional bar code reader configurations are not readily used to provide accurate measurement of objects.

SUMMARY OF THE INVENTION

The foregoing objects are attained by the invention, which provides a non-contact, laser strain extensometer for use in mechanical testing, including tensile, compression, flex, shear, tear fatigue and fracture testing of all types. In accordance with one aspect of the invention, a scanning laser beam is utilized to measure the separation of benchmarks placed on the specimen to be tested. The reflection of the laser beam from the benchmarks is focused on a photosensor to generate electronic pulses. The time duration between these pulses can be precisely measured using electronic counters. This time duration correlates with the distance separating the benchmarks.

Unlike other non-contact gages, the invention does not use a parallel laser beam, which would have restricted the instrument to measure relatively small benchmark separations. Additionally, the invention does not require the beam to be broken by the object under measurement. Instead, a revolving beam is used which can measure virtually infinite separation between benchmarks. The revolving beam can be generated either by a rotating polygonal mirror or an oscillating mirror.

In an aspect of the invention utilizing a rotating polygonal mirror, the angular velocity will be constant. However, the scanning velocity of the beam on the specimen under test will be infinite when the beam is parallel to the specimen, and equal to the angular velocity when the beam is perpendicular to the specimen. Thus, the beam velocity on the specimen will vary as the tangent of the beam angle as the beam revolves. To compensate for this continuously changing velocity, a further aspect of the invention utilizes a real-time computer for reading the instantaneous time separation of the benchmarks, along with the time separation of one benchmark from a fixed reference point, and mathematically correcting for this geometric variance.

In another aspect of the invention which utilizes an oscillating mirror to generate the scan, the difference between the sinusoidally changing angular velocity of the beam and the velocity of the beam on the measurement plane can be closely approximated by a first-order linear mathematical relationship over the desired measurement length by controlling the peak-to-peak angle of mirror oscillation. Thus, in accordance with this aspect of the invention, the laser strain extensometer can be calibrated to produce precise measurements of strain at dynamically changing rates over a wide range of distances without the need for geometric corrections. Furthermore, by using precisely placed benchmarks in the plane of measurements, the system can be automatically calibrated to compensate for all geometric variances.

The invention accordingly comprises the steps and apparatus embodying features of construction, combinations of elements and arrangements of parts adapted to effect such steps, as exemplified in the following detailed disclosure, and the scope of the invention is indicated in the claims.

BRIEF DESCRIPTION OF THE DRAWINGS

For a fuller understanding of the nature and objects of the invention, reference should be made to the following detailed description and the accompanying drawings, in which.

DETAILED DESCRIPTION OF THE ILLUSTRATED EMBODIMENTS

Figure 1:
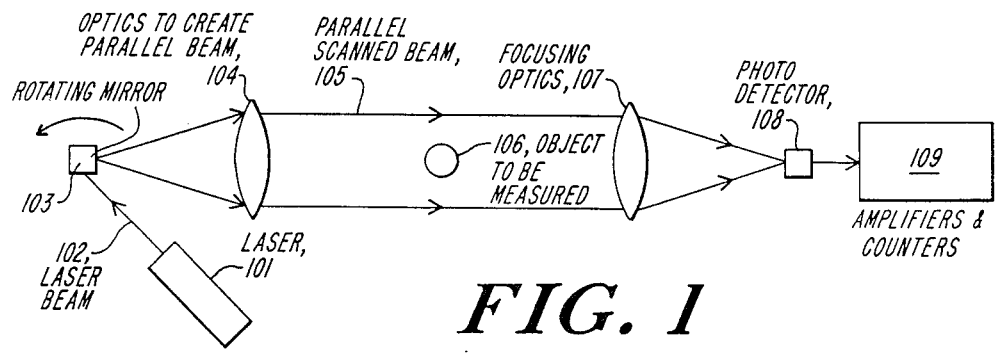
FIG. 1 is a schematic diagram depicting a prior art non-contact gage.

A typical prior art extensometer system is shown in FIG. 1. The system 100 utilizes a laser 101 to create a primary beam 102. This beam is reflected from a mirror 103 rotating at a precise speed, then passed through a lens 104 or mirror system to transform the rotating beam to a parallel scanned beam 105. A photodetector 108 is focused to cover the entire scan length and give an output proportional to the amount of light falling on it. The object 106 to be measured is placed between the detector 108 and the parallel lens 104, and the detector output changes when the object 106 blocks the scanned parallel beam 105. A preamplifier 109 amplifies the detector signal, the edges are detected, and the time interval between edges is measured. This time interval is a linear function of the object dimension. The length of the scanned laser beam field is limited by the size of the optics used to create the parallel beam, and the expense of these optics increases dramatically as object length and field length increase.

Figure 2:
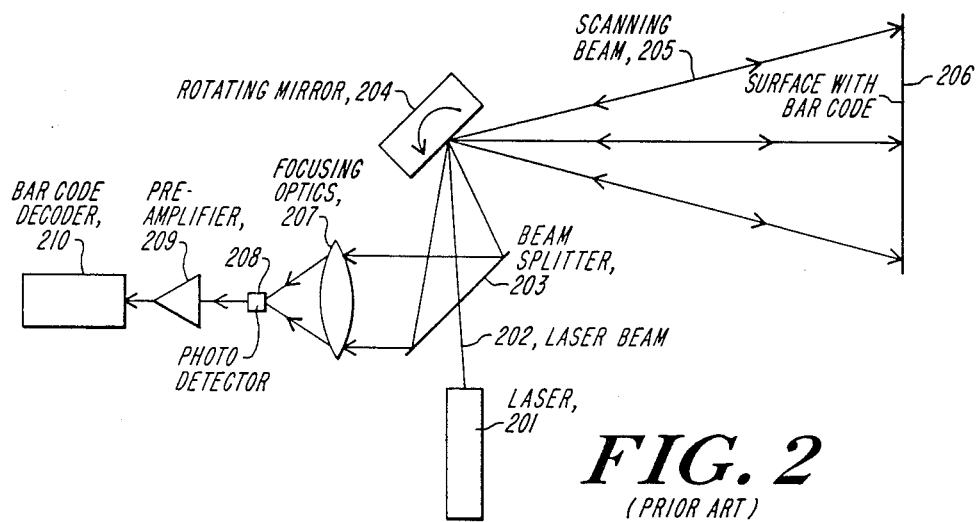
FIG. 2 is a schematic diagram depicting a prior art bar code readers.

A typical prior art bar code scanning system 200 is shown in FIG. 2. The system 200 utilizes a laser 201 to generate a primary beam 202. A scanning laser beam 205 is created by reflecting the primary beam 202 from a rotating mirror 204. This scanning beam 205 is passed over the printed bar code 206. A portion of the reflected light falls on the rotating mirror 204, is reflected back to the beam splitter 203, and is sensed by the photodetector 208. The photodetector output, which is proportional to the intensity of light falling on it, is amplified by amplifier 209 and fed into the bar code decoder logic circuitry 210. Conventional bar code reader configurations, however, are not readily used to provide accurate measurement of objects.

Figure 3:
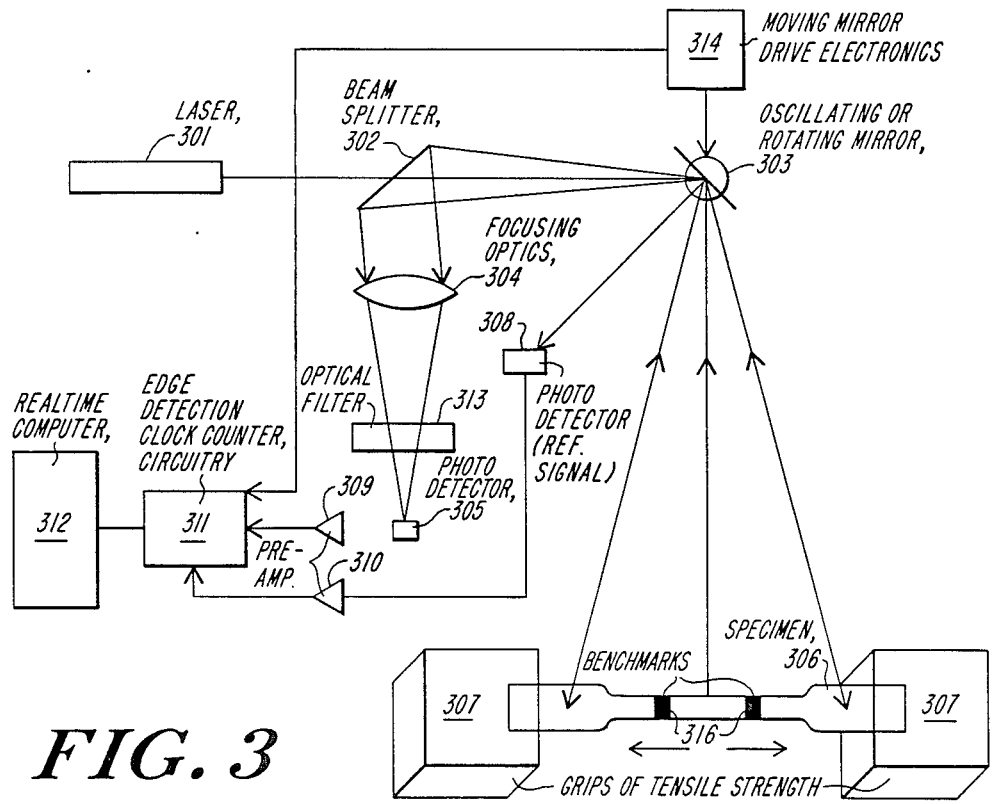
FIG. 3 is a block diagram of extensometer apparatus according to the invention

A laser extensometer system 300 according to the invention is shown in FIG. 3. A laser beam generated by laser 301 is passed through a beam splitter 302 onto an oscillating or rotating mirror 303, then exits the apparatus to fall on the specimen 306 to be measured. Specimen 306 is preferably marked with reflective benchmarks 316. Light reflected from the specimen falls on the moving mirror 303, is reflected back into the beam splitter 302, and onto a photodetector 305. The photodetector output is amplified by preamplifier 309 and the rising edges of the benchmark reflection signals are detected. These edge signals are used to gate an accurate clock in circuitry module 311, and a counter in circuitry module 311 measures the time interval between the edges.

In a preferred embodiment of the invention, a second photodetector 308 is mounted at a fixed known location in the scanned beam. The reference signal produced when the beam passes this photodetector 308 is amplified by preamplifier 310 and used to provide a reference position within the scanned beam which allows the real-time computer 312 to correct for geometric variances in a manner discussed in greater detail hereinafter. The rising edge of this reference signal, together with the rising edge of the first benchmark signal, is also used to gate the clock in circuitry module 311, and a second set of counters in circuitry module 311 measure the time interval between these edges.

Figure 4:
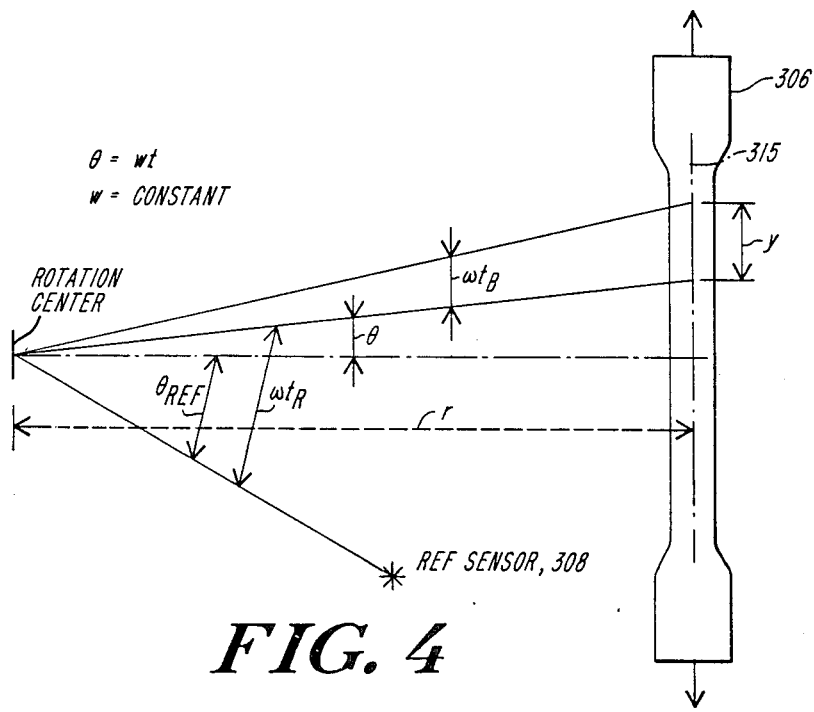
FIG. 4 is a schematic diagram depicting correction factor geometry for an embodiment of the invention using a rotating mirror.

FIG. 4 illustrates the geometry of an embodiment of the invention utilizing a rotating mirror to generate the scanned beam. If the scanned beam is generated using a rotating mirror (single or multi-faceted) the rotational velocity is constant. However, since the scanned beam is rotating about a fixed point and is scanning a flat surface, the velocity of the scanned beam will not be constant on the flat surface. In this case the position of the beam at any time can be described by the function:

$$y = r \tan(\theta)$$

where r is the perpendicular distance from the rotation center to the flat surface, y is the distance along the flat surface from the intersection of r and the flat surface to the beam position, and $\theta$ is the angle of the beam relative to the intersection of r and the flat surface. In particular, $\theta$ = angular velocity X time.

The correction equations are as follows:

If $(\omega t_r > = \theta_r)$, then $$\theta = \omega t_r - \theta_r$$
$$y = r \tan(\theta + \omega t_b) - r \tan(\theta).$$

If $(\omega t_r < = \theta_r)$, then $$\theta = \theta_r - \omega t_r$$

If $(\omega t_b > = \omega t_r)$ $$y = r \tan(\theta) \times r \tan(\omega t_b - \theta)$$

If $(\omega t_b < \omega t_r)$ $$y = r \tan(\theta) - r \tan(\theta - \omega t_b)$$

These corrections are performed by a real time computer 312 which can read the two counters. The value $\omega t_b$ is the first counter value multiplied by the period of the clock and the angular velocity of the mirror. Moreover, $\omega t_r$ is the second reference counter value multiplied by the period of the clock and the angular velocity of the mirror.

Figure 5:
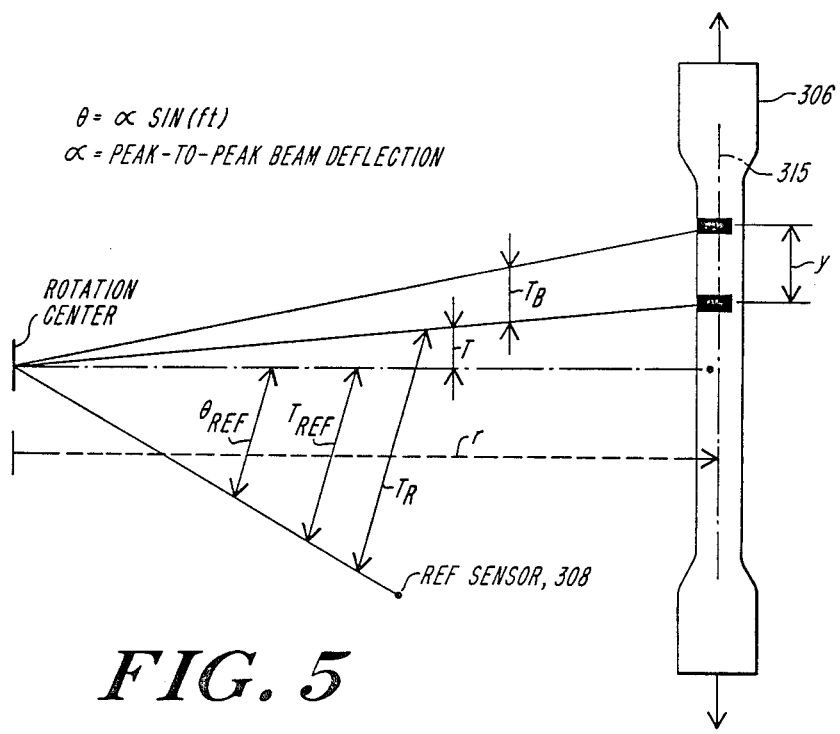
FIG. 5 is a schematic diagram depicting correction factor geometry for an embodiment of the invention using an oscillating mirror.

FIG. 5 illustrates the geometry for another embodiment of the invention, utilizing an oscillating mirror to generate the scanned beam. The geometry is similar to that of the rotating mirror embodiment discussed above. The mirror velocity, however, is no longer constant, and it is equal to $\alpha (\sin(f(t)))$, where $\alpha$ is the peak to peak angle of the deflected beam, f is the oscillating frequency of the mirror and t is time.

The correction equations are:
If $(T_r > = T_{ref})$, then $$T = T_r - T_{ref}$$
$$\theta = \alpha \sin(f(T_r - T_{ref}))$$
$$y = r \tan(\alpha \sin(f(T_r - T_{ref}) + T_b)) - r \tan(\theta)$$

If $(T_r < = T_{ref})$, then $$T = T_{ref} - T_r$$

If $(T_b > = T)$, then $$y = r \tan(\alpha \sin(f(T_{ref} - T_r))) + r \tan(\alpha \sin(f(T_b - T)))$$

If $(T_b < = T)$, then $$y = r \tan(\alpha \sin(f(T_{ref} - T_r))) - r \tan(\alpha \sin(f(T_{ref} - T_r - T_b))).$$

These corrections also can be performed by the real time computer.

In a preferred embodiment of the invention utilizing an oscillating mirror, the beam velocity on the flat scanned surface can be made highly linear over a desired scan angle (or measurement length) by adjusting the peak to peak deflected beam scan angle. This is because the equation which represents the distance to be measured is as follows:

$$y = r \tan(\alpha \sin(f(t)))$$

where)
r = distance from mirror to plane of measurement
f = frequency of oscillation,
t = time, and
α = peak to peak angle of the beam as it oscillates.

Figure 6:
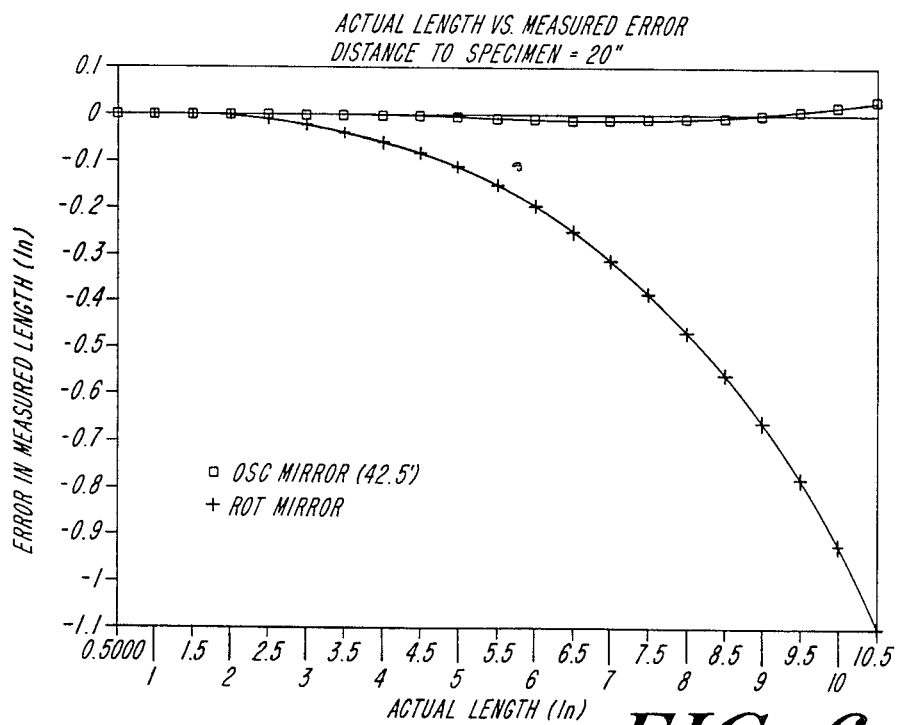
FIG. 6 is a plot showing actual length vs. measured error for non-corrected and corrected geometric errors (10 Inch Measurement)
Figure 7:
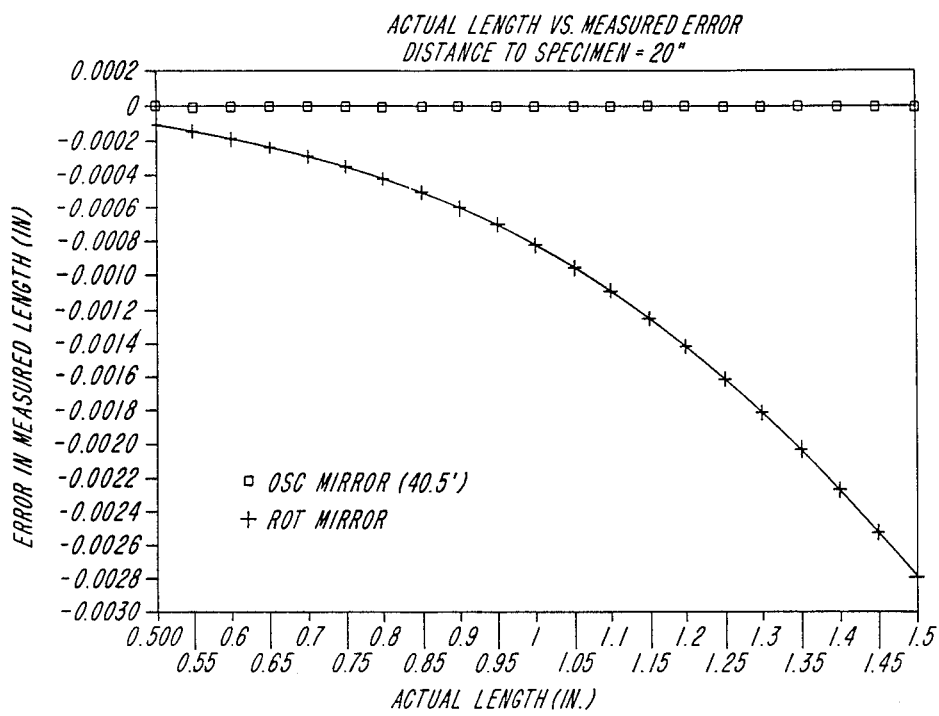
FIG. 7 is a plot showing actual length vs. measured error for non-corrected and corrected geometric errors (1 Inch Measurement)

By knowing r, f and by being able to control α the above equation can be made essentially linear, as shown in FIG. 6. FIG. 6 compares the uncorrected geometric variances of a rotating mirror embodiment with the variance after the automatic correction at an α of 42.5 degrees which is optimal for measuring up to 10 inches. FIG. 7 shows the same graph but with an α of 40.5 degrees which is optimal for measuring up to 1 inch. Similarly, an optimal value of α can be computed for each desired range of measurement. The accuracies attained by this method are more than sufficient for use in materials testing. This eliminates the majority of the correction calculations--only a simple multiplication is required--and eliminates the need for the second photodetector and associated circuitry.

A problem with all benchmarks as used in mechanical testing is that as the test specimen elongates, the benchmarks become distorted and reflected energy becomes "blurred", leading to erroneous results. Accordingly, a further preferred embodiment of the invention overcomes this problem by using clip-on, reusable mechanical benchmarks. The benchmark 316 shown in FIG. 8 preferably includes a reflective or contrasting surface 317. The benchmark 316 can be attached to the sample to provide a benchmark of sufficient contrast. The clip-on benchmark 316 will not distort or change its contrast as the specimen elongates. Since it contacts the specimen along a single line, it will move accurately with the specimen as it elongates. The line of contact is coincident with the edge of the reflective area, and thus no errors are introduced in the initial separation or "gage length".

Figure 8:
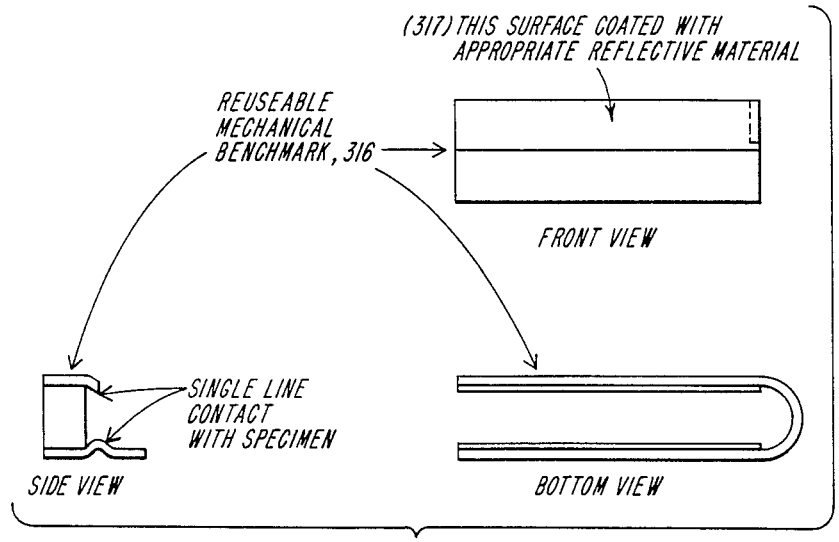
FIG. 8 depicts clip-on, mechanical benchmarks.

Those skilled in the art will appreciate that the benchmark surface 317 can be non-reflective for use with reflective specimens, or reflective for non-reflective specimens. While the benchmark 316 illustrated in FIG. 8 is preferred, if lesser accuracies are acceptable, benchmarks can be printed or drawn directly onto the specimen. Paper or plastic adhesive labels can also be used.

In addition to the means of error correction described above, the laser strain extensometer can also be calibrated by scanning a reference specimen with precise and known separation of benchmarks. This is because of the use of a real-time computer which can compare the actual value with the observed value and generate a correction factor. This correction factor can then be applied to compensate for systematic errors and geometric uncertainties. Different length calibration specimens can be used over the full range of desired measurements.

Those skilled in the art will appreciate that the invention uses reflected energy rather than absorbed energy. This is advantageous because the nature of mechanical testing, particularly the "dog-bone" shaped specimens utilized, often permits only the former. Additionally, the present invention allows measurements to be made over a wide, virtually infinite range. This is useful in mechanical testing, where benchmark separation varies from one (1) inch up to twenty (20) inches in the course of a test. Wide measurement range is achieved by using a revolving or oscillating beam rather than a parallel beam used in non-contact gages.

It will thus be seen that the invention efficiently attains the objects set forth above, among those made apparent from the preceding description. In particular, the invention provides a precise, cost-effective device for the non-contact measurement of strain for mechanical testing. It has only one moving part and allows for the measurement of small as well as large elongations. The laser strain extensometer is compact and ideal for robotic mechanical testing. Moreover, it is much easier to use conventional contact gages or non-contact optical extensometers.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In optical measurement apparatus for optically measuring deformation of a specimen under stress, the improvement comprising:
   A. marking means for marking the specimen with reflective benchmarks,
   B. scanning means for scanning an interrogating light beam across the specimen at a selected rate, so that light is reflected from said reflective benchmarks,
   C. photosensor means for receiving said light reflected from said benchmarks and for generating time-variant electronic pulses representative of said reflected light,
   D. time measurement means for measuring time between said pulses to provide a measure of separation between said benchmarks, and
   E. digital processor means, in electrical circuit with said scanning means, photosensor means, and time measurement means, for correcting geometric variances in measurement resulting from said scanning means.

2. In apparatus according to claim 1, the further improvement wherein said time measurement means includes
   A. clock means, responsive to said pulses, for generating a series of clock signals, and
   B. counter means, in electrical circuit with said clock means, for counting said clock signals produced by said clock means.

3. In apparatus according to claim 1, the further improvement wherein said scanning means includes a mirror element mounted for revolution.

4. In apparatus according to claim 3, the further improvement wherein said mirror element is a rotatable polygonal mirror.

5. In apparatus according to claim 4, the further improvement wherein
   A. said photosensor means includes reference photodetector means for detecting said interrogating light beam at a selected reference angle and generating in response thereto a reference signal, and
   B. said digital processor means includes means, responsive to said reference signal, for correcting geometric variances in measurement resulting from said rotatable polygonal mirror.

6. In apparatus according to claim 5, the further improvement wherein said digital processor means includes automatic calibration means, responsive to light reflected from fixed, reflective benchmarks on a reference specimen, said benchmarks having a known separation, for calibrating separation measurement of the optical measurement apparatus with respect to the known separation of the reference benchmarks.

7. In apparatus according to claim 1, the further improvement wherein said scanning means includes a plane mirror mounted for oscillation through a selected range of angles.

8. In apparatus according to claim 7, the further improvement wherein
   A. said photosensor means includes reference photodetector means for detecting said interrogating light beam at a selected reference angle and generating in response thereto a reference signal, and
   B. said digital processor means includes means, responsive to said reference signal, for correcting geometric variances in measurement resulting from said oscillating plane mirror.

9. In apparatus according to claim 8, the further improvement wherein said digital processor means includes automatic calibration means, responsive to light reflected from fixed, reflective benchmarks on a reference specimen, said benchmarks having a known separation, for calibrating separation measurement of the optical measurement apparatus with respect to the known separation of the reference benchmarks.

10. In apparatus according to claim 1, the further improvement wherein said marking means includes reflective benchmark elements arranged for removable mounting to selected points on the specimen.

* * * * *

UNITED STATES PATENT AND TRADEMARK OFFICE
CERTIFICATE OF CORRECTION

PATENT NO. : 4,869,110

DATED : Sept. 26. 1989

INVENTOR(S) : David L. Kent

It is certified that error appears in the above-identified patent and that said Letters Patent is hereby corrected as shown below:

Column 5, line 64, delete --where)-- and insert therefore, "where".

Signed and Sealed this

Fifth Day of November, 1991

Attest:

HARRY F. MANBECK, JR.

*Attesting Officer*  *Commissioner of Patents and Trademarks*